(12) United States Patent
K. C.

(10) Patent No.: US 11,852,042 B2
(45) Date of Patent: Dec. 26, 2023

(54) THERMAL BUOYANT HIGH EFFICIENT SYSTEM

(71) Applicant: Sudarshan K. C., Kapilvastu (NP)

(72) Inventor: Sudarshan K. C., Kapilvastu (NP)

(*) Notice: Subject to any disclaimer, the term of this patent is extended or adjusted under 35 U.S.C. 154(b) by 0 days.

(21) Appl. No.: 17/573,671

(22) Filed: Jan. 12, 2022

(65) Prior Publication Data
US 2022/0205432 A1 Jun. 30, 2022

Related U.S. Application Data

(63) Continuation-in-part of application No. 16/578,349, filed on Sep. 22, 2019, now abandoned.

(30) Foreign Application Priority Data

Sep. 26, 2018 (NP) .............................................. 681

(51) Int. Cl.
| | |
|---|---|
| *F01K 27/00* | (2006.01) |
| *F03B 17/02* | (2006.01) |
| *F03G 7/05* | (2006.01) |
| *F01K 25/06* | (2006.01) |
| *F01K 23/10* | (2006.01) |

(52) U.S. Cl.
CPC ............ *F01K 27/005* (2013.01); *F03B 17/02* (2013.01); *F01K 23/10* (2013.01); *F01K 25/065* (2013.01); *F03G 7/05* (2013.01); *Y02E 10/20* (2013.01)

(58) Field of Classification Search
CPC ........ F03B 17/005; F03B 17/02; F03B 17/04; F05B 2210/401; F05D 2210/41; F01K 27/005; F01K 25/06; F01K 25/065; F03G 7/05; F03G 6/00; F03G 6/003; F03G 6/004; F03G 6/005; F03G 6/071; F03G 6/074; F03G 6/083; F03G 4/00; F03G 4/001;
(Continued)

(56) References Cited

U.S. PATENT DOCUMENTS

| | | | | |
|---|---|---|---|---|
| 346,425 A | * | 7/1886 | Campbell ............. | F01K 25/065 60/649 |
| 3,788,091 A | * | 1/1974 | Miller ................... | F25B 41/335 62/332 |

(Continued)

FOREIGN PATENT DOCUMENTS

| | | | |
|---|---|---|---|
| CN | 202055234 U | * | 11/2011 |
| KR | 20200145631 A | * | 12/2020 |

*Primary Examiner* — Mark A Laurenzi
*Assistant Examiner* — Xiaoting Hu
(74) *Attorney, Agent, or Firm* — SOROKER AGMON NORDMAN RIBA; Daniel Schatz

(57) ABSTRACT

A system for the generation of mechanical or electrical energy from heat energy, where increasing a height or pressure in a liquid chamber of the system containing a liquid increases an efficiency of the system up to a hundred percent or increases such efficiency until a critical temperature or pressure of the vapor (gas) is reached at the bottom of liquid chamber or in the boiler of the system depending upon the increment in height, pressure and the type of liquid used in the system. An increase in height of the system for such increased efficiency can be adjusted to a smaller height by maintaining a series of liquid and gas chambers where the vapor flows through the series of chambers or by adding pressure valves. The heat energy from high to low temperature sources can be convened to mechanical and electrical energy.

13 Claims, 5 Drawing Sheets

(58) Field of Classification Search
CPC .......... F03G 4/033; F03G 4/035; F03G 4/063; F03G 4/066; Y02E 10/20
See application file for complete search history.

(56) References Cited

U.S. PATENT DOCUMENTS

| | | | | |
|---|---|---|---|---|
| 4,022,024 | A * | 5/1977 | Abeles | F03B 13/00 60/682 |
| 2014/0196450 | A1* | 7/2014 | Boyd | F03B 17/04 60/495 |
| 2020/0095896 | A1* | 3/2020 | K. C. | F22B 1/006 |
| 2021/0180471 | A1* | 6/2021 | Wright | F01K 25/08 |
| 2022/0074435 | A1* | 3/2022 | Fetvedt | F02K 3/00 |

* cited by examiner

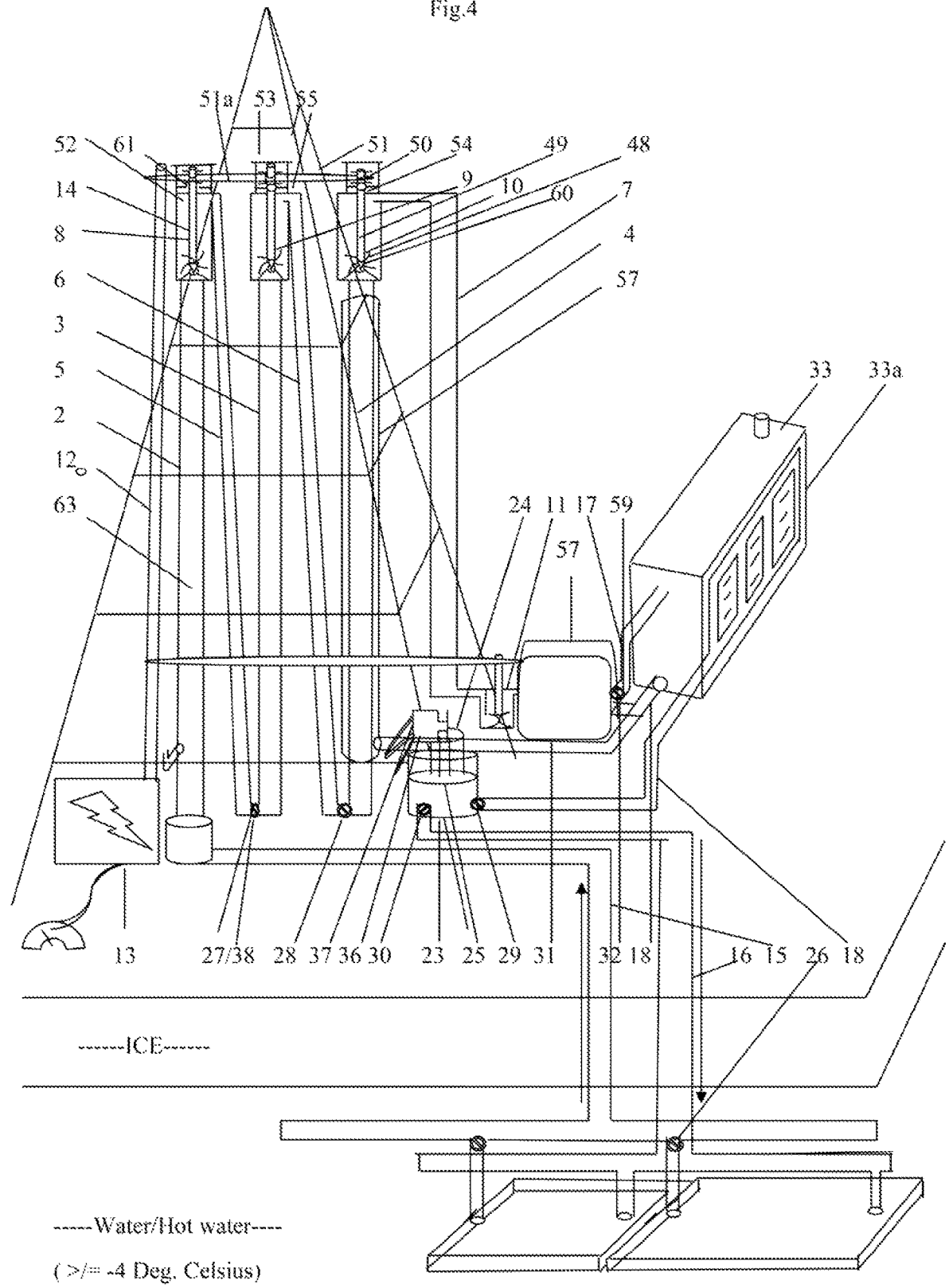

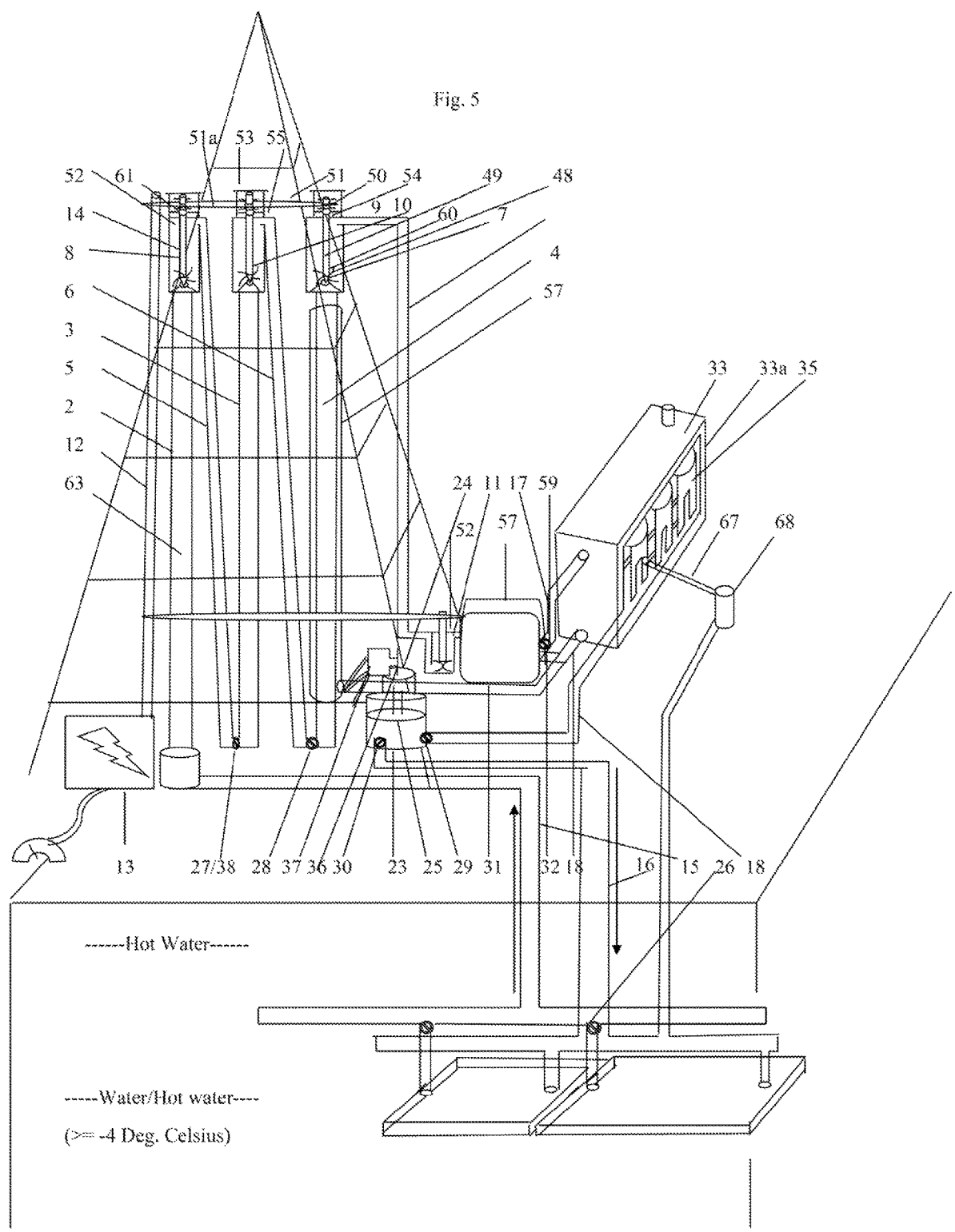

THERMAL BUOYANT HIGH EFFICIENT SYSTEM

FIELD OF INVENTION

The invention relates to the system that converts heat energy from sources of high temperatures and low temperatures (as low as room temperature) to electrical energy with a high efficiency of up to 100 percent or increases such efficiency until a critical temperature or pressure of the vapor (gas) is reached at the bottom of liquid chamber or in the boiler of the system. The buoyancy force is used as a kinetic force where vapor from boiler is accelerated in the liquid medium on the liquid pipes and runs the turbine at the top of the liquid pipes at the enlarged part. The increasing height of the liquid pipes or the increasing number of pipes in case of multiple liquid chambers increases the efficiency up to hundred percent or until critical temperature or pressure of the vapor is reached in the boiler or bottom of liquid chamber. Depending upon the liquid used in the boiler and in liquid chamber, a system with different height of liquid chamber or different number of liquid chambers of a certain height in case of multiple chambers have different efficiencies. Such efficiency can be increased with increased height or pressure. Liquid with low boiling point in the boiler and lower value of adiabatic ratio, boiling liquid with lower latent heat of vaporization and total heat of vaporization, high density liquid in the liquid chamber, boiling liquid with higher ratio of densities of liquid to vapor state also has an increased effect in efficiency of the system.

Increased height increases the pressure and output. Increased pressure increases the boiling, point of the liquid in the boiler while decreases the latent heat of vaporization. The total heat i.e. the latent heat of vaporization and specific heat of the liquid, required for input increases in a decreasing manner with the increase in height and output. So, efficiency increases with increased height of chambers of the system.

Increased pressure adding pressure valve in liquid chamber also increases the efficiency up to hundred percent with a same effect.

Increased pressure can be controlled in the boiler by increasing the size of the boiler. This allows for the use of low temperature heat despite an increase in height and pressure.

The increased height of system for increasing efficiency up to hundred percent that can go very tall of up to 100 s of meters can be brought into normal height of 5-10 meters by maintaining the series of liquid and gas pipes with a same effect in output and efficiency.

Using different liquids, dense in the liquid chamber and light weight and low boiling point liquid in the boiler increases the efficiency.

Where cooling mechanisms are available, the atmospheric heat can be used to generate electrical energy.

Concentric pipes at the upper part of the system or at the later part of the system where a series of liquid and gas chambers are maintained is added to collect the cooling temperatures when the liquids of dissolving nature are used. The cooling temperatures can be brought to external use or used in the condenser.

Use of mechanical energy can be carried out directly without conversion to electrical energy.

The liquid flow cycle is maintained where the liquid is boiled in the boiler for evaporation and vapor generation which is allowed to flow through tall chambers for generation of energy and is condensed or dissolved with other liquid in the condenser and finally returned to the boiler for continued generation.

BACKGROUND OF THE INVENTION

The use of thermal energy for conversion to mechanical and electrical energy has been done through engines like steam engine, petrol engine, diesel engine from a long period. These engines use fossil fuels and require high temperatures. The efficiency of these engines do not exceed 50 percent. Practically, steam engine has about 18 percent efficiency, while petrol and diesel engine has about 35% and 45% efficiency respectively.

U.S. 6,223,532 B1 [1 May 2001] discloses a system that works on buoyancy and thermal difference. The invention does not deal with an increasing height and pressure of the system for increasing efficiency and hence has low efficiency. The reduction of an increased pressure in the boiler for using the low temperature sources despite rise in pressure and the rise in boiling point due to increased height and pressure is not facilitated by the system that makes the system incompatible for low temperature heat sources and low temperature storages. The binary cycle discussed in the invention requires heat exchanger and different liquids in every cycle. Height and other pressurizing mechanism are not maintained and works on thermal differences. So the system has low efficiency.

DE 12859 C discloses a system that uses water vapor and buoyancy for energy generation. The system does not disclose the height required for efficiency increment. The pressure differences for higher efficiency and using pressure valves for increment in efficiency are not found in the system. Similarly, the use of rotational system after the steam is ejected makes the system difficult. Low efficiency, inability for using low temperature heat, not compatible for low temperature heat storages etc. are the deficiencies of the system.

Therefore, a system with high efficiency of up to hundred percent, that can avail low temperature heat sources, where low temperature heat storages are possible, compatible for lower height, that can use clean energy that have mass availability and low temperature sources, is required. The sunlight falling in the vast lands and the heat in the oceans during summer or winter are such mass available clean energy. Geo-thermal at lower depth also has low temperature. Low temperature sources are also available from waste heat of production process in a huge amount. The invention solves these issues utilizing such energy sources.

SUMMARY OF INVENTION

A thermal buoyant high-efficient system generates mechanical and (or) electrical energy from heat energy through buoyancy force, brought by an increasing height(s) and pressure and changing size of the boiler.

A boiler is placed in the ground level or is dipped in the hot (or warm) water inside the oceans and lakes. The boiler placed in the ground level is heated by direct sunlight or hot water flowing to the plates or pipes of the boiler enclosed by outer cover. The outer cover is insulated unless an atmospheric temperature is used to boil the liquid in the boiler.

The boiler opens to a liquid chamber(s). A single liquid chamber with an increasing height is used to increase the efficiency up to 100 percent. Or, multiple liquid chambers joined by gas chambers are used where similar efficiency up to 100 percent can be obtained at lower heights. The number of multiple liquid chambers is so maintained such that the total height of each of the multiple chambers is equal to the height of the single chamber for an equally-efficient systems while the liquids, boilers and condensers remains the same.

A valve is placed in between the boiler and the liquid chamber when different liquids are used in the boiler for boiling and in liquid pipet(s) for obtaining buoyancy force. The upper part of a liquid chamber contains a cylinder open from below joined to the liquid pipe and enclosed from all sides. The top part of the cylinder opens to a gas chamber. The cylinder contains a turbine with tilted blades presented horizontally while the turbine is placed vertically the shaft of which opens outside the cylinder through a washer or gasket at the joint. The washer or gasket is placed in a housing maintained therein at the joint.

The shaft above the cylinder is supported by a horizontal bearing vertically supported on each side. A pulley is also present at the upper part of the shaft above the bearing support. A belt or multiple belts joins the pulley to the axle of an alternator. The alternator is placed nearer to the cylinder at the top or at the bottom with taller axle to the height of the liquid chamber.

Where a number of liquid and gas chambers are maintained, the lower part of the gas chamber opens to the bottom of an another liquid chamber. The gas chamber is joined to the liquid chamber through a valve system. This valve system uses a normal valve or pressure valve and the liquid gas chambers can also be used without applying the valves where the liquid in the liquid chambers fills the gas chamber while cylinder has some vacant space equal to the volume of the gas chamber. The pressure valve is applied at the lower part of single liquid chamber while at initial part in a series of liquid-gas chambers for higher efficiency.

The gas chamber opens to the cylinder. The cylinder controls the pressure and temperature of the vapor before entering the condenser. The cylinder is insulated. The vapor then enters the condenser. The condenser contains a number of multiple heat exchanger pipes joined to each other at the front or later part and placed horizontally in the liquid medium inside a container. The vapor inside the multiple pipes expels the heat to the liquid in the condenser. The container expels the heat to the environment through thermally conductive container. Instead of multiple pipes, drums half filled with dissolving liquids are used in the condenser where the vapor dissolves instead of condensing forming the solutions of gasses or liquids and such solutions are boiled in the boiler.

A push up and down mechanism or a centrifugal motor is used to expel the condensed liquid from the condenser to the boiler.

Where cooling mechanisms are available, the liquid with boiling point lower than the temperature of the environment is used for boiling in the embodiment to generate energy using the room temperature.

Pressurized gas (i.e. liquefied gas) or subliming solids like carbon di-oxide mixed with liquid can also be used in the embodiment instead of boiling liquid in the boiler where cooling mechanisms are available to depressurize or sublime the solids when low temperatures are required for depressurizing or subliming.

Advantageous Effects of the Invention

The invention can convert low temperature heat energy to mechanical or electrical energy with a high efficiency up to hundred percent until a critical temperature or pressure is reached in the boiler or liquid chamber. Here, a low temperature differences can be used to convert the heat energy to mechanical or electrical energy. To fulfill our energy needs and to use clean energy as our day to day energy or in production and construction process, a huge amount of energy is required. Clean energy available in such amount are in low temperature form like sunlight in vast lands, ocean heat during summer, temperature differences in ocean during winter with frozen surfaces and liquid lower layers, geo-thermal to some depth or even waste heat of production process. Similarly, high efficiency conversion is another advantage that is achieved by the invention. Use of heat storages can be brought in use by eliminating the use of battery that uses costly and harmful chemicals. Using clean energy can reduce global warming, increase global health by reducing pollutions and minimize the climate changes and its harmful effects.

BRIEF DESCRIPTION OF DRAWINGS

FIG. 4 is an example embodiment of multiple chambers thermal buoyant system for implementation of the process of generation of mechanical and electrical energy from heat energy on frozen lakes/seas/ocean especially during winter (day and night) with a liquid as working fluid in the boiler.

FIG. 5 is an example embodiment of multiple chambers thermal buoyant system for implementation of the process of generation of mechanical and electrical energy from heat energy on hot water areas (day/night and any season when hot water is available) and with solution of gasses or solution of liquids as working fluid in the boiler.

DETAILED DESCRIPTION OF INVENTION

Figure 1:
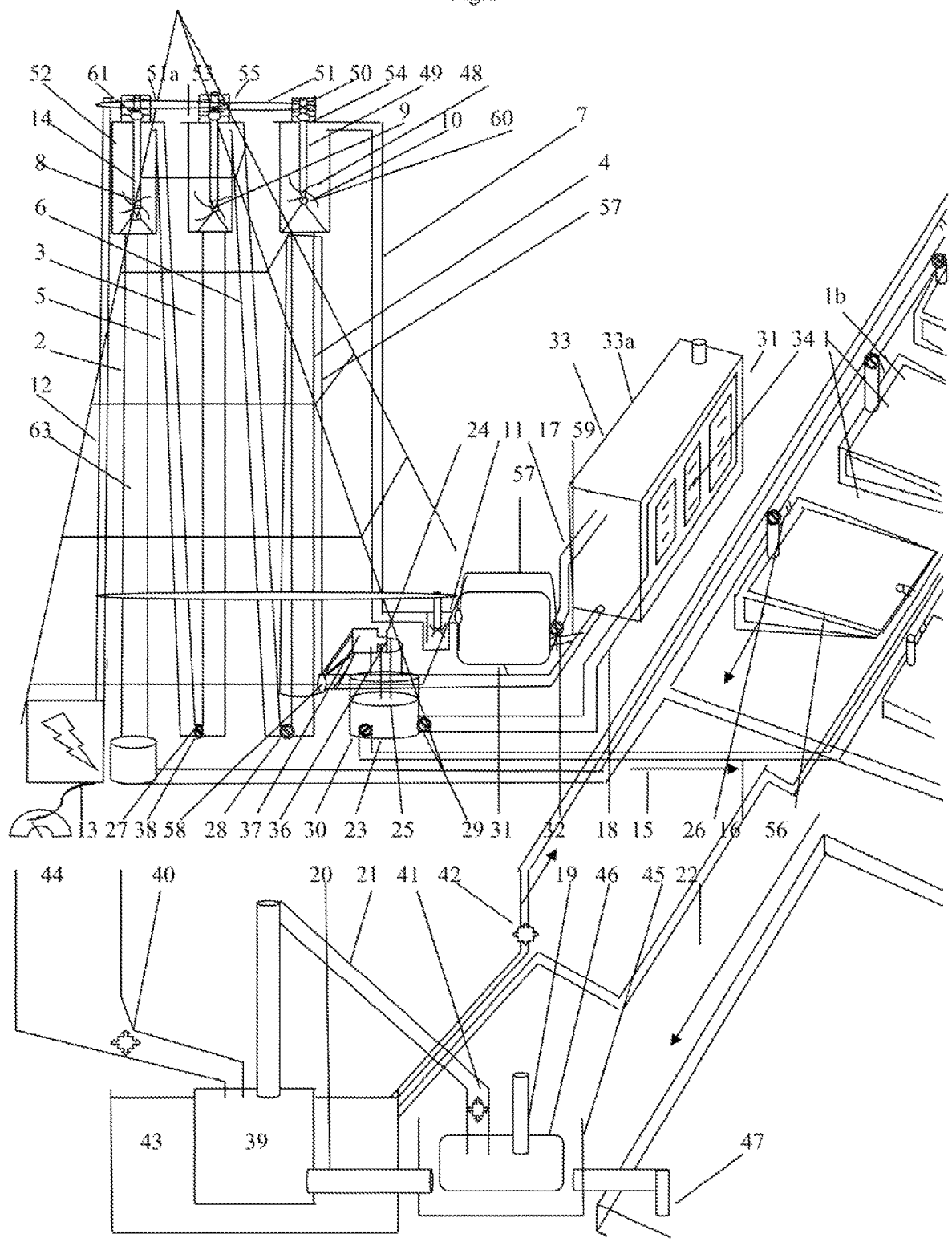
FIG. 1 is an example embodiment of multiple chambers thermal buoyant system for implementation of the process of generation of mechanical and electrical energy from heat energy using day sunlight and storage system for Night/Out of Sunlight/Winter season and with a liquid as working fluid in the boiler.

The invention uses the following parts/items:
Boiler 1,
Boiler cover 1a,
Vertical pipe 1b,
Liquid Chamber 2, 3, 4,
Gas Chamber 5, 6, 7
Liquid Turbine 8, 9, 10,
Gas Turbine 11,
Axle 12,
Alternator 13,
Tower or stand 14,
Vapor output pipe/horizontal pipe 15,
Liquid In Pipe 16,
Condenser In pipe 17,
Condenser out pipe 18,
Water In pipe 19, Water Out Pipe 20,
Water pipe 21,
Hot water circulation pipe 22
Liquid Re-input Section 23
Washer 24, 25,
Vapor-Liquid phase valve 26,
Chamber Valves 27, 28,
Liquid Input Valve 29,
Liquid Output Valve 30,
Cylinder 31
Cylinder valve (pressure control/regulation valve) 32,
Condenser 33,
Container 33a,
Multiple-pipes 34,
Drums 35,
Pusher with switching mechanism 36,
Compressor/motor 37,
Pressure valves 38, 38a,
Heat generation tank 39,
Motors 40, 41, 42,
Hot water reservoir 43,
Chemical storage tank 44,
Water heater 45,
Water tank 46,
Dehydrating vessels 47,
Other Inner Parts/Items:
Turbine blades 48,
Turbine shaft 49,
Pulley 50, 50a, 50b,
Belt 51, 51a, 51b,
Cylinder [Enlarged Part of Liquid Chamber for liquid or gas turbine] 52, 52a, 52b,
Cylinder cover 53, 53a, 53b,
Connection Washer or gasket 54,
Cover washer or gasket 55,
Insulation of boiler 56,
Concentric pipes/cylinders 57,
Condenser cooling pipe 58,
Concentric cylinder pipe 59,
Lower bearing support 60,
Upper bearing support 61,
Boiling liquid 62,
Liquid-Chamber's Liquid 63,
Condenser Liquid 64,
Dissolving Liquid 65,
Solution of gasses 66,
Liquid control pipe 67,
Control chamber 68.

FIG. 1 is described with the nomenclature. Other figures [FIG. 1-5] resembles each other mostly and described only on differences.

One or more boiler(s) [1] is placed at the ground level. It is flat in shape. The flattened size of the boiler is to increase the area of the boiler. The increased area reduces the pressure, as pressure is inversely proportional to the area. Using flattened boiler, the pressure of the liquid does not increase proportionately with the increase in pressure above it. This gives the opportunity to avail the low temperature heat despite the rise in pressure above the boiler in a liquid chamber [2]. So depending upon the temperature of the available heat source and the boiling point of the liquid [62, 66], a proper trade off is brought by increasing the size of the boiler i.e., its area till the increased boiling point due to increased pressure in the lower part of the liquid chamber [2] is below the temperature of the available heat source.

The necessity of using flattened boiler i.e. the boiler with larger area than the area above it where the vapor accumulates or larger than the area of liquid chambers is required only for the low temperature heat sources while this is not required where the high temperature heat sources are available.

The boiler [1] is placed in an air tight cover [1a] where warm water flows inside a cover to heat the boiler [1]. The boiler cover [1a] is insulated. One or more boilers [1] are present that has a flattened area depending upon the temperature of available heat source and an opening vertical pipe [1b].

The boiler consists of a flattened shape plates joined form the outer side with a space in between. It can also consist of multiple pipes placed horizontally in parallel in a series and joined to each other on the top and bottom part. Adding multiple pipes jointly in parallel and lying on a same height will also increase the surface area of the liquid at that height along with increasing the strength of the boiler. The central top part of either of the boiler structure contains a vertical pipe called vertical head with a Vapor-liquid phase valve [26] at the top of vertical head. The vertical pipe is joined to the liquid chamber [2] with a horizontal housing pipe [15]. Both the structure of the boiler has an increased area. This boiler is placed inside a flat closed container covered from all sides where the heating liquid is flown to the covered part outside the boiler to heat the boiler. The cover is insulated. Where the boiler is to receive the sunlight, the upper surface of the boiler cover is made up of transparent material like glass, transparent plastics etc.

Nevertheless, the boiler [1] can be a general boiler (not shown) where the heat source is of high temperature. The general boiler means the boiler with a space inside it above the boiling liquid (or solutions) [62, 66] where the vapor accumulates with an horizontal area equal to the surface area of the liquid. The pressurized vapor flows above through the valve [36]. In the general boiler, the vapor accumulates above it thereby increasing the pressure in the boiling liquid equal to the area of the liquid. This will bring an increase in the pressure of the liquid in the boiler equal to the pressure of the vapor. In such a boiler the boiling point of liquid increases with the increase in pressure. Boiling point of water is about 100° C. at one atmospheric pressure while at 30 atmospheres the boiling point of water increases to 234° C. When such a boiler is used with water as a boiling liquid the input heat of above 234° C. is required from a heat source when the pressure is increased to 30 atmospheres.

However, the modified boiler used in the invention and described above i.e. with flattened structure is such that it has a flat surface and a narrow vertical head. Similar other structures can include any shaped boiler with a narrow head at any place on the upper part and liquid is filled to such upper part and the pressurized vapor is filled only in the upper narrow part. The vapor accumulates in the narrower part creating pressure in the valve [26] above it. Where no valve is used and the boiler is directly connected to the liquid chamber through the horizontal housing pipe [15], the narrow vertical part boiler is exerted with the pressure of the liquid pipes. In either case, the vapor is exerted with the pressure in the narrow part. This pressure exerted on the vapor is passed to the boiler with increased area. And hence such pressure is dispersed over the area of the boiler and the pressure in not increased proportionately in the boiler. When the liquid boils in the boiler, the vapor is accumulated in the lower part of the valve [26]. When the pressure of the vapor in the narrower part becomes more than the pressure above the valve [26] or at the valve [26], the vapor is released above to the liquid chamber. Before releasing the vapor exerts equal pressure to the lower part i.e. flat part. However pressure is inversely proportional to the area, the increased part is exerted with less pressure depending upon the area to which the boiler flattens.

Where no valve is present the liquid boils in the low pressure flat part. The vapor is forced to flow upward narrower part of the boiler due to buoyancy force. The buoyancy force is greater than the force generated form difference in pressure which requires the vapor to flow from the low pressure part of the boiler to the high pressure part of the liquid chamber. Here, bottom of the liquid chamber has a comparatively high pressure due to its small area compared to the flat boiler.

Figure 2:
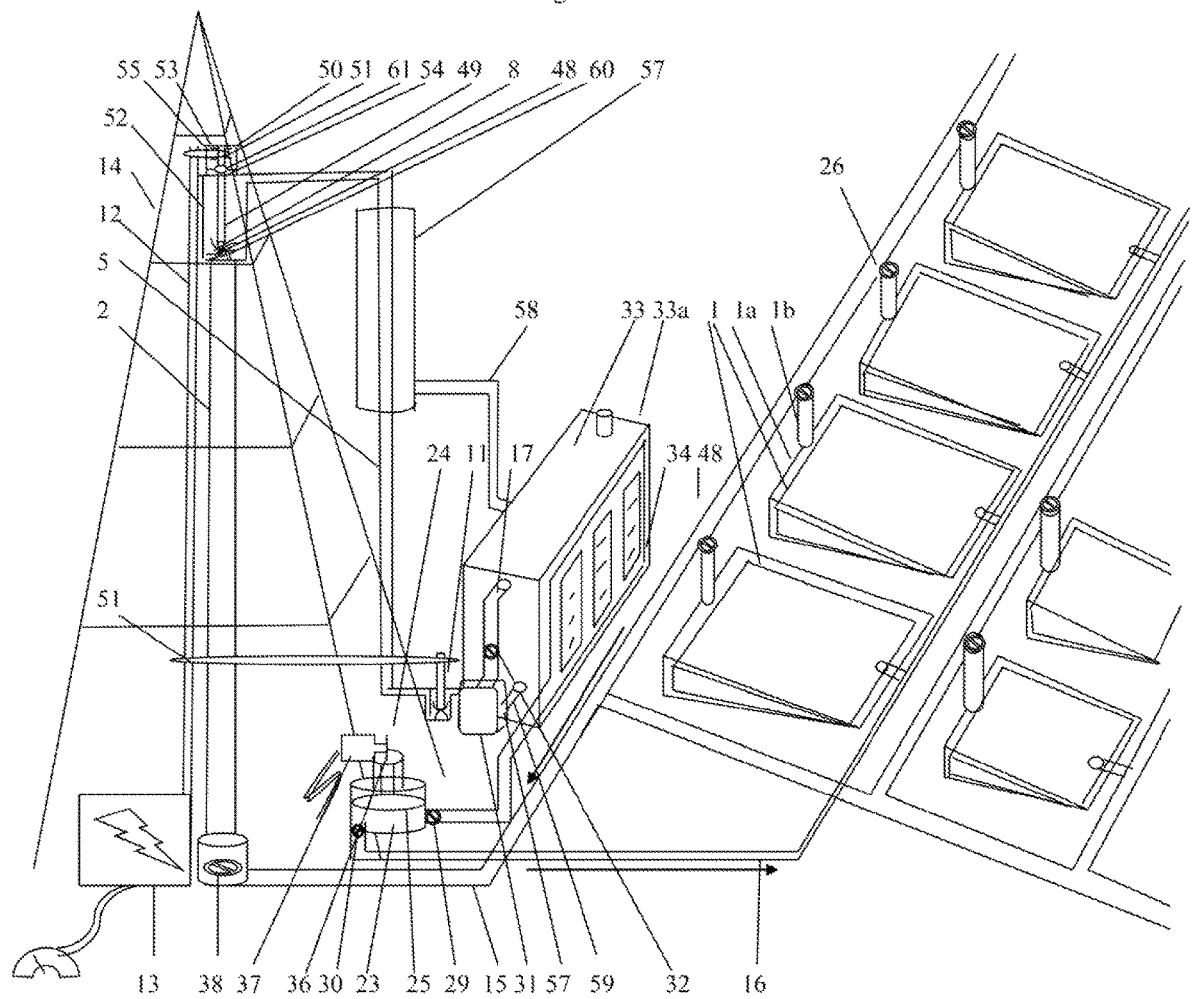
FIG. 2 is an example embodiment of single chamber thermal buoyant system for implementation of the process of generation of mechanical and electrical energy from heat energy using only sunlight energy during the day and with a liquid as working fluid in the boiler.
Figure 3:
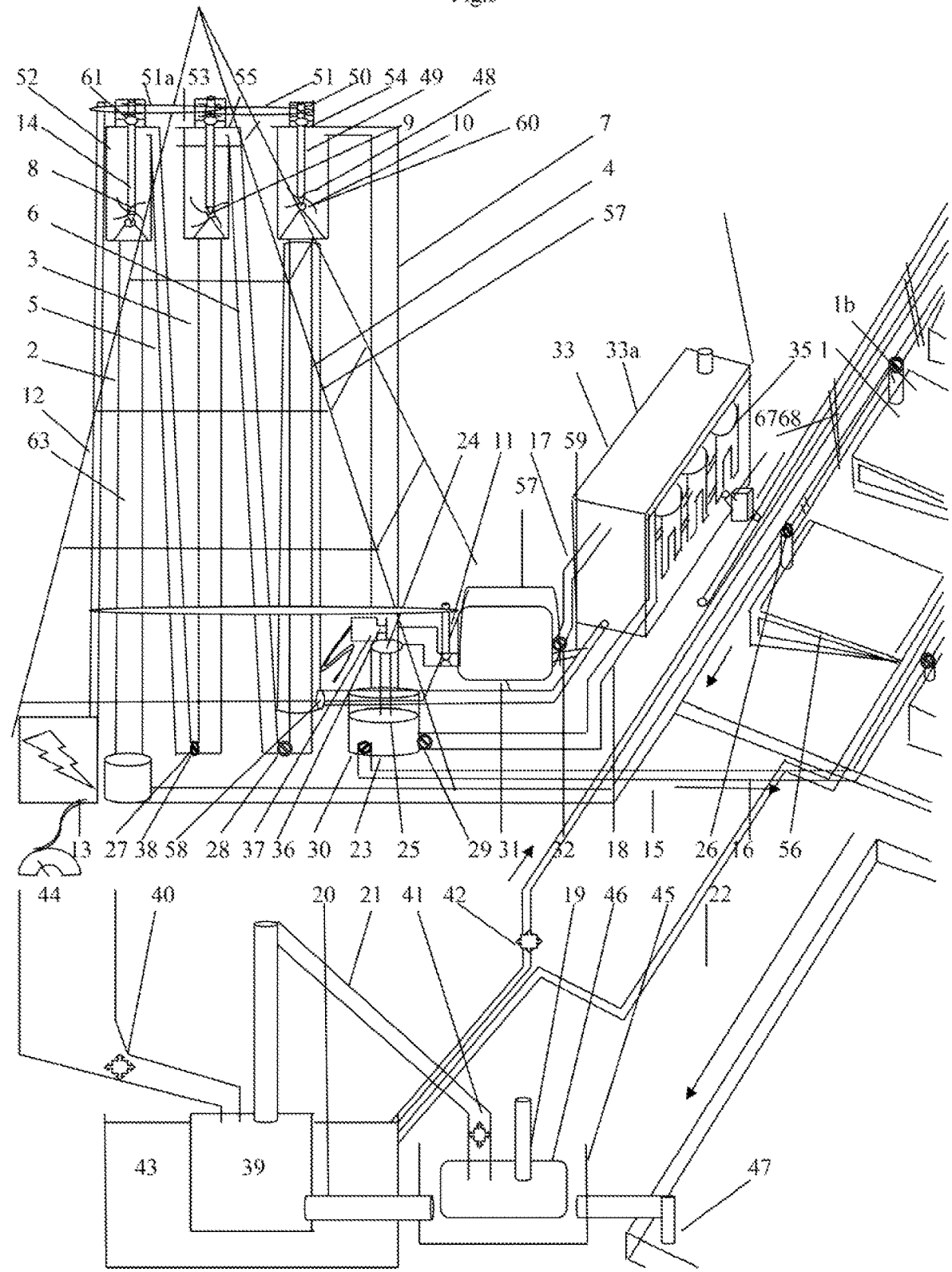
FIG. 3 is an example embodiment of multiple chambers thermal buoyant system for implementation of the process of generation of mechanical and electrical energy from heat energy using only sunlight energy dining the day and storage system for Night/Out of Sunlight/Winter season and with solution of gasses or solution of liquids as working fluid in the boiler.

The boiler is placed above the ground level as shown in FIG. 1, FIG. 2 and FIG. 3. However, the boilers are also placed below the ground level in the oceans and lakes where the heat from the oceans and lakes is to be used as input energy as shown in FIG. 4 and FIG. 5.

The vertical pipe [1b] of the boiler [1] containing a vapor-liquid phase valve [26] opens to a horizontal pipe [15] which provides housing to a number of boilers [1]. The valve [26] in the vertical pipe [1b] of the boiler [1] can be removed where similar liquid is used in the boiler [1] and in the liquid chamber(s) [2, 3, 4].

The horizontal pipe [15] opens to a liquid chamber [2]. The liquid chamber [2] is a tall pipe filled with liquid [63] and is insulated. The upper part of the liquid chamber is enlarged with a cylindrical shape cylinder [52] where the pipe of liquid chamber opens from below and the upper part of the cylinder (i.e. enlarged part) [52] opens to a gas chamber [3] from one side. The top part of the cylinder [52] is enclosed by a air-tight cylinder cover [53]. The cylinder [52] contains a turbine [8] with tilted blades [48] around a vertical shaft [49]. The turbine [8] stands on a lower bearing support [60] at the lower part of the cylinder in its center allowing the vapor to flow 15 along its side. The shaft [49] of the turbine [8] crosses above the upper part of the cylinder [52]. A washer/gasket [55] is placed at the connection part of the cylinder [52] and the shaft [49] from either inward or from above or even both at a same time of the cylinder cover in a housing. The cylinder cover [53] can be a flange type (not shown) or a cork type (not shown) with inner threads. These flange or cork type cylinder cover [53] contains a washer/gasket [54] The turbine [8] is placed similar to the position of a ceiling fan inside the cylinder [52] with similar blades alignment however more in number.

The upper part of the shaft [49] is supported by a vertical support from either side with a bearing support [61] in the middle through which the shaft [49] passes. Above the bearing support [61], a pulley [50] is placed with at least a belt [51]. The belt [51] is used to join the pulley [50] with an alternator [13] to convert the rotational energy to electrical energy. Similarly, a belt [51] is also used to join the turbine [8, 9, 10] with other turbines [8, 9, 10].

The gas chamber [5] is a pipe similar to liquid chamber [2] and is placed vertically downward and insulated from outside.

As shown in FIG. 2 the gas pipe i.e. gas chamber [5] opens to a Gas turbine [11] in a gas turbine cylinder [52] similar to liquid cylinder however is at a lower height and then to a temporary storage cylinder [31] where only a single set of liquid-gas chamber is maintained.

With the increase in height of the liquid-gas chamber the efficiency of the system increases. The taller the height of the liquid-gas chamber, the addition is in the efficiency. With increased height of the liquid-gas chamber the efficiency increases up to 100 percent or until critical temperature and pressure of boiling liquid is reached depending upon the parameters of liquid used for boiling and the liquid used in liquid chambers, the latent heat and total heat of the liquid boiling, the ratio of liquid to vapor state of the boiling liquid, the adiabatic ratio of the vapor of the boiled liquid etc. For approaching up to 100 percent efficiency, height can reach above 100 s of meters depending upon the additional pressure, type of boiling liquid, type of liquid-chamber liquid etc.

A similar efficiency of up to hundred percent or increased efficiency till the critical temperature and pressure of vapor is reached in the boiler or the bottom of liquid chamber of a single liquid-gas chamber of a very tall height of 100 s of meters can be obtained even at lower heights by maintaining multiple liquid-gas chambers. Here, the height of the single liquid gas chamber is divided to a number of small height liquid-gas chambers such that the total height of the small height liquid-gas chambers when added equals the height of a single liquid gas chamber for same efficiency at lower height.

So, for multiple liquid-gas chambers, the first gas chamber [5] arising from the first liquid chamber [2] opens to the second liquid chamber [3] from below. There is a valve [27] at the lower part of a gas chamber between a gas chamber and next liquid chamber, separating one set of liquid-gas chamber from the other. Similarly the second liquid chamber [3] opens to the second gas chamber [6] from its cylinder [52] with a turbine [9] similar to turbine [8]. The second gas chamber [6] opens to the bottom of a third liquid chamber [4] through a valve [28]. A third gas chamber [7] opens from the top enlarged cylindrical part [51] with a turbine [10] of the third liquid chamber [4] from a side and opens to the bottom of another liquid chamber (not shown). In this way, a series of liquid-gas chambers are maintained to increase the efficiency up to 100 percent or critical temperature and pressure of the vapor of boiling liquid (or gas of solutions of gasses) is reached. The valves [27], [28] used between the gas chamber and liquid chamber can be replaced by pressure valves [38], [38a]. However, the pressure valves [38, 38a] are used at initial sets of liquid and gas chambers in the series of liquid and gas chambers to obtain higher efficiency. Similarly, for single set of liquid-gas chamber of a taller height that can approach 100 s of meters for higher efficiency or until the critical temperature and pressure of the vapor is reached in the boiler or bottom of liquid chamber, the pressure valve [38] is placed at the lower part.

The valves [27, 28] between the gas chamber(s) [2, 3, 4] and liquid chamber(s) [5, 6, 7] can be removed, where the gas chamber [5, 6, 7] is filled with the liquid [63] from liquid chamber and the liquid chamber (2, 3, 4) has a space unfilled at least equal to the volume of the liquid [63] in the gas chamber before operating the system. When the system operates the vapor fills every gas chamber [5, 6, 7] displacing the liquid [63] to the unfilled area of the liquid chamber inside the cylinder [52].

Although a series of liquid-gas chambers can be maintained until the hundred percentage efficiency or until a critical temperature or pressure is reached in the boiler or at the bottom of first liquid chamber [2], only three sets of liquid-gas chambers are described here and shown in the FIG. 1, FIG. 3, FIG. 4 and FIG. 5.

The last gas chamber [7] opens to a Gas turbine [11] in a gas turbine cylinder [52] which then opens to a buffer storage cylinder [31]. The gas turbine cylinder [52] also contains a turbine similar to the turbines [8, 9, 10] however it runs with only temperature differences between the boiler and condenser. Or, in other words, the vapor is generated in the boiler and condensed in the condenser due to temperature differences creates a continuous flow of vapor to the condenser. This flow of vapor runs the gas turbine [11]. The temporary storage cylinder [31] has a bigger space that is used to control temperature and pressure.

The buffer storage and control cylinder [31] opens to the condenser [33] through a valve [32] in condenser in pipe [17].

The condenser [33] has a number of pipes named multiple-pipes [34] placed horizontally and joined to each other either at top or at bottom. The pipes are heat exchangers and are dipped in the condenser liquid [64]. The pipes and liquid is inside a thermally conductive container [33a]. The pipes, liquids and container act as a heat exchanger and transmitter that jointly transfer the heat released by the vapor or gas inside the pipes to the environment through container walls. The multiple pipes [34] transmit heat to the condenser liquid [64] and then the condenser liquid [64] transmits heat to the environment through the walls of container [33a] of the condenser [33].

Where the vapor of boiling liquid [62] is of dissolving nature instead of condensing like ammonium hydroxide or carbon di-oxide, drums [35] are used instead of multiple-pipes [34] in the condenser [33]. The drums [33] are filled with liquid [65] that can dissolve the gas. These drums [35] are half-hollow from below and open from a side. This is done to increase the surface area of the drums [35] contacting the liquid [64] in the condenser and at the same time minimize the requirement of dissolving liquid [65] inside the drums [35] without decreasing its area of contact with the gas (here gas is used instead of vapor because they are not condensed instead dissolved in dissolving liquid).

Where the cooling systems, mechanisms or matters are available, the system can run with the atmospheric heat. In such a situation, cooling is provided in the condenser while the boiler is not insulated instead is used with thermally conductive layer and the condenser is insulated. The cooling matters can be ice from mountains or frozen oceans. Wasted cooling temperatures from cooling systems, cooling towers, waste cooled material or any other mechanisms are usable.

The condensed vapor from the multiple-pipes [34] of the condenser [33] moves to the liquid re-input section [23] through condenser-out pipe [18] and liquid input valve [29]. A push up and down mechanism of washer [24] and [25] i.e. a motor [37] with a piston and washers [24, 25] is used to expel the liquid condensed or dissolved in the condenser [33]. The condensed liquid flows to the liquid re-input section [23] through condenser-out-pipe [18] kept vertically and when the weight of liquid in both items become greater than the weight of the washers, it pushes the washer [25] along with washer [24] in upward direction. As the washer [24] reaches to the pusher [36], the weight of the condensed liquid in the outward pipe [18] of the condenser [33] still increases, and the washer [24] is further pushed upward to the switching part of pusher. The motor [37] of pusher connected to the external circuit is switched and the pusher [36] pushes the washer [24] along with [25] downwards expelling the liquid in section [23] outwards to liquid in pipe [16] through valve [30]. When the washer [24] reaches to a minimum level due to the pusher [36] of motor [37], the power to the motor [37] of pusher [36] is switched out and the pusher [36] stops pushing. The washers [24], [25] again move up gradually to previous position due to increasing weight of condensed liquid from the condenser [33] in the vertical condenser-out pipe [18] and in section [23]. Again the next pushing starts when the required weight of liquid is condensed. Thus, a continuous flow of the condensed liquid accumulated in the liquid re-input section [23] is maintained outwards the pipe [16] through valve [30] to the boiler [1].

Similarly, a centrifugal motor (not shown) with a added switching mechanism can be used directly instead of a push up and down mechanism in the liquid re-input section. The condensed or dissolved liquid is sent to the motor [37] through Condenser-out pipe [18]. A push in and out mechanism is an upward and downward movement of the washer [24] of a piston with a flow of the liquid when filled and operating with the liquid sensor/pusher [36] and a motor [37] to run washers [24], [25] up and down expelling the liquid outside the condenser. When the liquid is filled the sensor/pusher notices the liquid and pushes or switches the motor [37] of the pusher. In the mechanism, the motor [37] starts automatically when a certain amount of liquid gets accumulated. The ratio of density of liquid to gas is high so for a certain amount of vapor generated and displacement of liquid to gain buoyancy force in liquid chamber a very little amount of liquid is involved compared to volume of gas. On using push up and down mechanism, the motor [37] do not run in useless hours as it switches only when liquid is accumulated and stops when liquid is pumped totally. So, energy efficiency is achieved on using the mechanism where powerful motors are required to transfer the condensed liquid to the pressurized boiler.

The condenser [33] opens to the boiler [1] through liquid in pipe [16] for the flow of condensed or dissolved liquid to the boiler to re-boil the liquid [61] and continue the energy generation in the system. For solutions of gasses during boiling, as the gasses have low boiling point and vaporize at low temperature, the dissolving liquid stays in the boiler. The dissolving liquid [65] is sent from the boiler at low concentration to the dissolving drums [35] with a liquid circulation pipe [67] and a liquid control chamber [68].

A tower or other support systems [14] is used to hold the system vertically. The taller height of the liquid-gas chambers requires for the taller towers, stands or pillars.

An alternator [13] is placed either at the top nearer to the cylinder [52] or at a ground level joined to the axle [12] approaching the height of pulleys [50] and joined to the belt [51, 51a, 51b]. Single alternator [13] can be maintained where the pulleys [50] are connected through belts or an alternator shall be joined to each turbine of the cylinder individually or in some groups.

The pressure valves [38] shall be used in the liquid-gas chambers joints at the lower part. The increase in pressure helps to increase the efficiency at lower heights compared to the systems without such pressure usage. The pressure valves [38] are used at the lower level of the single liquid-gas chamber while at initial sets of liquid-gas chamber where a series of liquid-gas chambers are used.

The low temperature heat of the ocean can be utilized where the boilers are dipped inside the ocean or lakes and condenser are placed on the upper frozen part in winter as shown in FIG. 4 and use the hot water of oceans, lakes during summer or of stored reservoirs with insulation in any season as shown in FIG. 5. Reverse is done in summer where the boiler is placed on the surface while the condenser is dipped below the ocean (not shown) or in air medium. FIG. 4 exhibits a system run by boiling liquids while FIG. 5 exhibits the system run by solutions of liquids or gasses as a working fluid. The system runs with a very low thermal difference as pressure plays the major role to run the system. Low temperature differences work in the system because high pressure of the liquid chambers are adjusted in the boiler by increasing the area of the boiler so that the liquid in the boiler is not exerted with the high pressure of the liquid chamber and do not increase the boiling point of the boiling liquid. The vapor in the low pressure boiler is forced to move upward to the high pressure liquid chamber due to buoyancy force.

The system can avail the thermal energy from low to high temperatures so the energy storage can be done in thermal medium instead of batteries. The heat energy is stored in hot water in a insulated tank or in latent heat of chemicals. It can be stored even in chemicals by endothermic reaction and obtain heat with exothermic reaction when required. As for example, reaction of sodium hydroxide with water produces heat which can be used for power generation and dried again for reuse. Similarly, storing in latent heat of salts are other ways for heat storage. Salts with low melting points when dehydrated melts and stores a latent heat which is released during condensation or crystallization. As for example sodium acetate melts at 52° C. Other salts lose some water and melts at low temperatures.

For storage a chemical storage tank [44] (as in FIG. 1 and FIG. 3) is used for larger application where heat is stored in form of chemicals like sodium hydroxide. These are well insulated, tanks for long term storage. These chemicals are sent to the heat generation tank [39] by a motor [40] when the stored heat is to be brought in use. Such a heat generation tank [39] is surrounded by hot water reservoir [43]. Hot water from the hot water reservoir [43] flows to the boiler through hot water connection pipe [21] and a motor [42] while cold water is received from the boiler to the hot water reservoir for heating in the heat generation tank [39]. A motor [41] is used to flow the fresh water from water tank [46] inside the water heater [45] through water in pipe [19] and water from heat generation tank [39] is sent to water heater [45] through water out pipe [20]. The hydrated chemicals or salts from water heater [45] finally flow through water out pipe [20] to dehydrating vessel [47].

The dehydrating vessel [47] of the storage system is used for heat collection and use when no sunlight or other sources of heat are available. Here, the chemicals like sodium hydroxide or low temperature melting salts are placed in the dehydrating vessel that receives the heat from sunlight or waste heat from industries. Water or other liquids can also be placed in such vessel for heat capture and storage. Such a dehydrating vessel [47] can also be placed at the lower part of earth to some depth to obtain geo-thermal energy. In some cases, evaporating liquids are placed in the dehydrating vessel and the evaporation is collected through pipes in heat generation tank that releases heat during condensation (not shown). The evaporating liquids are resent to the dehydrating vessel through a motor.

Cold water is sent to the dehydrating vessel [47] and warm water is received in return in case chemicals like sodium hydroxide are dehydrated or water or other liquid are used in heat storage. While in case of molten salts (not shown), they are placed inside dehydrating vessels enclosed by, a heat exchanger and a space between enclosed heat exchanging part and the dehydrating vessel act as an insulated part. The latent heat is released during condensation, in such a condensation, the insulation is removed and as they are brought in contact with cold water running in dehydrating vessel through a heat exchanger.

Dehydrating vessels [47] are insulated and contain transparent medium like glass or transparent plastics on the upper part where heat is received through sunlight, in case where heat is to be required from other heated materials like hot air, geo thermal the dehydrating vessel contains heat exchanger medium and insulation is done only during storage. The system can convert the low temperature heat to mechanical or electrical energy with high efficiency of up to 100 percent so a low temperature storage medium can be utilized for storing heat for the system. Low temperature heat storage can be used for longer period due to comparatively less heat loss then high temperature heat storage. However, when heat is stored in chemicals like sodium hydroxide much longer period of storage can be maintained. Storing the heat and using when necessary eliminate the requirement of batteries it also helps to reduce the peak load of grid where the excess energy is stored in form of heat and the power is generated while the peak load is reached in the grid.

Moreover, for hot water storage system (not shown), hot water is heated in the water heating tank and is stored in the Water storage tank. Water heating tank contains a electrical heater or other heating medium and is small in size than the water tank where the cold water from water storage tank is flown for heating and hot water is stored in water tank. Electrical heater is used where the excess electricity of grid is to be stored in the form of heat. Other heating medium includes the heating from the waste heat of chimneys, waste heat from hot materials like molten or heated metals during cooling after smelting, hot clinker from cement industry etc. These heated materials are brought in contact in the heat exchanger part of the water heating tank that contains water inside it which gets heated when in contact with those materials. The heat is stored in the water tank which is insulated and contains a motor for flowing cold water to the water heating tank and hot water by a motor to the boiler of the thermal-buoyant system for generation of mechanical and electrical energy. For larger applications hot water reservoir can be maintained. Such a reservoir can be made either under the ground or above it. They are insulated from all sides containing an insulating layer between the two brick or RCC [reinforced cement concrete] layers on all sides including up and down. A layer of thermocol, glass-wool or similar insulating materials can be used between brick walls.

Where only mechanical energy is required, the alternator is not required in the system. This generally finds application in industries and similar other areas where the rotational torque of the turbine can be directly used to run the mills or wheels.

The working principle of the system is that the vapor is generated from the liquid boiled in the boiler. The boiler being flat shape has an area quite larger than the area of the bottom of liquid chamber. This increase in area decreases the pressure in the boiler despite increase in pressure above it brought by the increase in height or pressure addition measures. Pressure valves [38, 38a] are used for additional pressure. The increase in pressure in the boiler does not have proportionate effect in the pressure of the boiler. So, the boiling point of the liquid in the boiler does not increase. The boiling point is maintained to the temperature of the available heat source adjusting the area of the boiler.

When the heat is applied to the boiler, the vapor evaporates and starts boiling. The vapor then approaches the lower part of the liquid chamber through liquid-vapor valve [26]. The lower part of the liquid chamber has constrained area compared to the boiler. The vapor in this part faces high pressure due to constrained area. Here, the movement of the vapor from low pressure to, high pressure is supported by the decrease in speed of vapor in the high pressure area. Due to buoyancy force the vapor is forced to move in upward direction despite the high pressure in the upward direction above the boiler.

The temperature of the vapor increases in the bottom of the liquid chamber than the boiler due to increase in pressure i.e. compression. The increase in temperature supports the rise of the vapor to a taller height which would otherwise condense in the middle height of the liquid chamber after certain height if the vapor of same temperature of the boiler rises in the liquid chamber. However, in case of normal boilers (not shown) the pressure rise equal to the pressure at the bottom of the liquid chamber. Such a rise in pressure will have an impact in the increase in output without proportionate increase in input thereby increasing the efficiency. However, with such a rise in pressure boiling point of the liquid boiling in the boiler also rises. So, such a boiler works only when high temperature heat sources are available to boil at the increased boiling point.

Where low temperature heat sources are available, flat boiler is used. Pressure does not increase proportionately in the flat boiler because the pressure is dispersed over the area of the flat boiler. However, the vapor should remain only in the narrower part of the boiler for such a decrease in pressure. Here, the liquid boils at low temperature despite rise in pressure at the bottom of liquid chamber. The vapor is than forced to the high pressure area i.e. narrower part of the boiler and then to the liquid chamber due to the buoyancy force. Here, in the high pressure part of boiler and liquid chamber, the temperature of the vapor rises due to compression providing the required temperature to the vapor to reach the top part of the liquid chamber without condensing, in the middle part. The pressure due to height of the liquid chamber or total height of liquid chambers including pressure valves when added can be increased to the level where the critical temperature or pressure of the vapor is reached at the bottom of the liquid chamber. The increase in pressure and temperature in such a boiler takes place above the boiler. So, low temperature heat is required in the boiler while the condensed liquid in the condenser has the temperature nearer to the temperature required in the boiler as condensation takes place at atmospheric temperature when no other means is used. Only the latent heat of vaporization is required in the next cycle to a greater portion as the condensation point is nearer to the boiling point. However, in case of high pressurized boiler where the boiling point increases with the pressure, the condensing point is also greater and condensing is done by expelling the heat to the atmosphere, the temperature falls in the condenser much lower than the condensing or boiling point. This requires the input of specific heat including latent heat of vaporization in the boiler. Where latent heat is only required, the latent heat falls with the increased pressure so less input is required compared to the increase in output. Where both specific heat and latent heat is required, the total heat increases at the decreasing rate with increasing pressure and output due to increased height or added pressure valve, the ratio of output energy to input heat energy increases for every increased height or pressure and hence the efficiency increases. Here, such a height of chamber or series of chambers or pressure due to pressure valve can be increased until a critical temperature or pressure is reached in the boiler or in the lower part of the liquid chamber.

Liquids in the boiler include liquids [62] in pure form or solutions of gasses [66] or solutions of liquids [66]. Pressurized gas (i.e. liquefied gas) or subliming solids mixed with liquid can also be used in the embodiment instead of boiling liquid in the boiler where cooling mechanisms are available to depressurize or sublime the solids when low temperatures are required for depressurizing or subliming.

In the liquid chamber(s) [2,3,4], the vapor accelerates in upward direction due to continuous buoyancy force applied in the vapor till it approaches the top part. With every increase in height the volume of the vapor increases. This increased size of the vapor is exerted with an increased buoyancy force as density decreases on one hand while increased weight of the liquid equal to the increased volume of vapor is displaced at the top of liquid chamber thereby increasing the level of liquid. Increasing buoyancy force implies for an increase in acceleration and hence the vapor faces meta-acceleration as it moves upward.

The meta-accelerated vapor hits the tilted blades [48] of the turbine from below. The kinetic energy of the vapor rotates the turbine in the cylinder [52] i.e. at enlarged part. The vapor than enters the gas chamber [5] from the top of the cylinder [52]. In the gas chamber, it fills the gas chamber [5].

A series of liquid-gas chamber [2,3,4 and 5,6,7] are maintained to obtain high efficiency at lower height, the vapor passes from the first gas chamber [5] to the second liquid chamber [3] from below. In the second liquid chamber [3], it gains meta-acceleration in the same manner it has obtained in previous chamber. At the top of second liquid chamber [3], it again rotates turbine [9] and enters the second gas chamber [6].

Where no valves are present between the gas chamber of initial set of liquid-gas chamber and liquid chamber of next set of liquid-gas chamber, the liquid fills the gas chamber before operating the system while the liquid chamber posses a space i.e. unfilled area equal to the volume of the liquid in the gas chamber at its upper enlarged part i.e. in cylinder [52]. When the vapor enters the gas chamber from the top of the liquid chamber, the liquid in the gas chamber is pushed below which enters the succeeding liquid chamber from below till it is emptied. Then the vapor starts passing to the succeeding liquid chamber from below.

After second gas chamber [6], the vapor flows to the third liquid chamber [4] from bottom part either through the valve [28] or without it as the system is maintained. In the third liquid chamber [4], the vapor also gains acceleration as in previous liquid chambers [2,3] and rotates the turbine [10] at the top as the vapor passes through the tilted blades [48]. The vapor then flows to the third gas chamber [7]. In this way the vapor flows to a series of liquid gas chamber till a hundred percentage of efficiency is gained or till a critical temperature and pressure of the vapor is reached at the bottom of the first liquid chamber [2] where the flat boiler is used and when such temperature and pressure is reached in the normal boiler [1] where general boiler is used.

Here, where the vapor passes from boiler [1] to the first liquid chamber [2], it experiences the pressure equal to the weight of the liquid [63] in the first liquid chamber [2]. As the vapor flows to the second liquid chamber [3] from the lower part of it through first gas chamber [5], the pressure equal to the weight of the liquid in the first liquid chamber [2] and second liquid chamber [3] is exerted in the vapor at the bottom of first liquid chamber [2]. Now the vapor at the bottom of the first liquid chamber experiences the weight of the liquid [63] in the first liquid chamber [2] and second liquid chamber [3].

As the vapor moves ahead from second liquid chamber [3] and approaches the bottom of third liquid chamber [4], the vapor at the bottom of first liquid chamber [2] is also exerted with the weight of third liquid chamber [4]. At this state, the vapor rising from boiler [1] at the bottom of the first liquid chamber [2] is exerted with the weight of the liquid [63] of the first liquid chamber [2], second liquid chamber [3] and third liquid chamber [4]. In this way, as the number of series of liquid-gas chambers increases, the weight of liquid [63] in every additional liquid chamber exerts pressure in the bottom of the first liquid chamber [2]. The pressure in the bottom of first liquid chamber [2] in a series of liquid-gas chambers is thus similar to the pressure at the bottom of single liquid chamber (where single liquid chamber is maintained) with the height equal to the total height of the multiple liquid chambers. This allows the division of the height of a liquid chamber to multiple liquid chambers of lower heights to obtain the same efficiency obtained in the single liquid chamber of a very tall height of 100 s of meters for obtaining up to hundred percent efficiency or till critical temperature and pressure is reached in the bottom of chamber or at boiler. Thus, high efficiency of up to 100 percent is also obtained at lower height maintaining a series of liquid-gas chamber where the same gas flows from boiler [1] to the final gas chamber [7] and condenser [33].

The output increases with the increase in height because the output is the outcome of potential energy of displaced liquid at a height that is converted to kinetic energy. When the gas of a certain volume approaches to the top, it displaces the liquid equal to average of its volume at top and bottom over its flow from bottom to top. This displacement of the liquid in upper direction over the flow of liquid to the top is converted to kinetic energy due to buoyancy. So, the output is the multiplication of average of mass of liquid displaced, acceleration due to gravity and the height to which the vapor is accelerated. For the increase in output with the given input energy applied on a given liquid, the height is required to be increased.

However, with the increase in height, the pressure and boiling point of liquid in the boiler increases along with output. The increase in pressure increases the input energy. This energy input for the increase in height and output is not directly proportional to the increase in the output. Instead, the total energy input increases at a decreasing rate with every increase in height and output. Or in other words, the increase in total input energy i.e. the latent heat of vaporization and the specific heat of vaporization increases at the decreasing rate with an increase in height of the system and the output of the system. For every additional height and output, the input energy increases at a diminishing rate and the ratio of output energy to input energy increases. Or in other words, the efficiency of the system increases for every increase in height of the system and its output till the output increases up to a hundred percentage efficiency or till a critical temperature and pressure is reached in the boiler or bottom of liquid chamber above boiler.

Similarly, where the liquid of low boiling point is used, the liquid condenses or dissolves in the condenser at the temperature nearer to the temperature of the atmosphere. Here, the specific heat is not required and only latent heat plays the major role in boiling. So, in such a situation the latent heat decreases with the increase in pressure brought by increase in height or increase in additional pressure of pressure valve. Where the high temperature heat sources are available, the increase in pressure and boiling point of liquid in boiler has an increasing effect in the output and decreasing effect in the input thereby giving the increased efficiency with such increase in pressure. Where low temperature sources are only available, the flattened boiler is used where the vapor is generated at low temperature and boiling point that is compelled to enter the high pressurized area of the liquid chamber due to buoyancy force being greater than the difference in pressure. This increases the temperature further thereby allowing the vapor to reach the tall height of 100 s of meter and increasing the efficiency of the system at the same time.

The efficiency is also affected by a number of factors like the latent heat of vaporization of the liquid used, the density of the liquid used in the liquid chamber, the adiabatic ratio of the vapor of the boiling liquid, the temperature difference in the boiler and condenser etc. The lower the latent heat of vaporization a higher output and efficiency is obtained at comparatively lower height. Similarly, the dense the liquid in the liquid chamber, the greater the pressure in the vapor and higher the output and efficiency at comparatively lower height. The lower the value of adiabatic-ratio of the vapor of the boiling liquid in the boiler, higher the efficiency and output of the system at lower height.

The pressure plays the important role in the efficiency despite the temperature differences and height of the system. Although, the output of the system increases with height, it also increases with the increase in pressure. Such a pressure can to some extent be increased by using comparatively dense liquid in the liquid chamber. For a considerable increase in pressure at lower height, the pressure valves are used between the gas chamber of the preceding liquid-gas chamber and the liquid chamber of the succeeding liquid-gas chamber.

With the increase in pressure in addition to the pressure given by the weight of liquid, the vapor is highly compressed and hence gas expands adiabatically. This gives additional force to the vapor rising towards the turbine in addition to the buoyancy force. This additional force increases the output. This increase in force is not brought by the height of the liquid chamber although the height increases the pressure proportionally. This increase in force can be obtained at lower heights of the system by the addition of pressure valves. Thus the output increases at lower heights. As the boiling point and total input energy increase at the diminishing rate with the increase in pressure, the ratio of output energy to input energy increases with the increase in pressure and hence there is an increase in efficiency at increased pressure.

The pressure valves [38] are placed at the lower part of the single liquid-gas chamber. Similarly, in case of series of liquid-gas chamber the pressure valves [38, 38a] are placed at the initial sets of liquid-gas chambers. Doing so, the pressurized vapors released from the pressure valves are able to accelerate a height more than the height when they are placed in the middle or later part. As the efficiency is proportional to the average height due to the displacement of the liquid with average of the volume at the top and bottom of the liquid chamber(s), placing the pressure valves at the initial part of series of liquid-gas chambers will increase the average volume of vapor or average height to which the vapor encompasses in the liquid medium gaining the buoyancy force. On placing at later part, the pressurized vapor escapes above the last turbine without much acceleration due to buoyancy force instead runs the gas turbine with comparatively high acceleration. However, gas turbine [11] is not efficient than the liquid turbines [2,3,4] due to added buoyancy force in liquid turbines to the height of the liquid.

The pressure created by the weight of the liquid or added pressure due to pressure valves 38, 1038a at the bottom of the liquid chamber 2 to the vapor decreases the density of the liquid. The liquid faces meta-acceleration due to the increasing buoyancy force acting in it brought by decrease in density as the vapor moves upward. Such a decrease in density is brought by an increase in volume due to adiabatic expansion. So such an increased force is calculated by taking the average volume for displacement. Now, when an additional pressure is created by adding pressure control valves there is an increase in the speed of the gas in upward direction. The vapor accelerates more in the liquid medium then it was, had there been no such pressure addition. Such an increase in force will not have any impact in the volume of the gas instead the volume before the pressurized point decreases. So, the increase in volume does not give the impact of additional pressure. The adiabatic expansion gives more work done in the turbine by the gas.

The adiabatic expansion of the vapor (gas) performs the work depending upon the value of gamma i.e. adiabatic ratio. For the adiabatic expansion, work done is inversely proportional to the value of gamma. So the boiling liquids with lower value of gamma are used to increase the output and efficiency of the system.

When a vapor rises, it has a buoyant force. The differences in density of liquid in which the vapor is rising and the density of vapor give the buoyant force to the vapor in upward direction. As the vapor rises, it grows in size. This is because of the decrease in pressure at upper part. Now, the density of the vapor still decreases. Or in other words, the buoyant force increases. As the buoyant force is due to the difference in density, with the increase in height the buoyant force increases. The increasing buoyant force gives the vapor an increasing acceleration i.e. meta-acceleration. When the vapor rises from a high pressure, it increases in size. Or, in other words, it expands. Here the nature of expansion is adiabatic. The expansion brings meta-acceleration. So, the meta-acceleration can be calculated through adiabatic expansion. The increasing force is in behalf of adiabatic expansion.

The vapor (gas) flows to the gas turbine [11] where the flow of vapor or gas runs the turbine. The vapor (gas) then reaches the cylinder [31].

The cylinder [31] is used to regulate the temperature and pressure along with the storage of vapor for some period. A pressure valve [32] is present between the cylinder [31] and the condenser [33] which controls the pressure in the cylinder [31]. A certain pressure is maintained in the cylinder [31] and the vapor is released to the condenser [33] depending upon the condensing rate. Where a higher condensing rate of the condenser [33] persists than the rate of boiling in the boiler [1], the vapor is released instantly while it is stored if there is a lower rate of condensation. During storage for some time in the cylinder, the heat is expelled to the atmosphere and helps in condensation. The heat is expelled or is taken from the liquid in the concentric cylinder [57] when such concentric cylinders [57] are maintained. These cylinders [57] give heating temperatures or cooling temperatures for use in condenser or for external use. Where solutions of gasses are used cooling temperatures are obtained and in case of sole liquids with boiling or condensing points more than atmosphere temperatures heating or warm temperatures are obtained.

The vapor expels the heat in the condenser through the multiple pipes acting as a heat exchanger. The condenser liquid absorbs heat and expels to the environment through the thermally conductive container walls.

When the solutions of liquids or gasses are used, the dissolving liquid [65] is sent to the boiler with high concentration. At the boiler the concentration of the solution decreases due to the rate of evaporation of the dissolved gasses (or liquids) more than the rate of evaporation of dissolving liquid. So, to maintain the concentration the dissolving liquid [65] is circulated to the dissolving drums [35]. In dissolving drums [35] the gasses dissolves and increases the concentration of the solution. The heat expelled during dissolving is expelled to the liquid of the condenser [33] and then to the environment through the container [33a] of the condenser. The liquid circulation pipe [67] is used to re-circulate the low concentration liquid to the condenser from the boiler while a liquid level control valve in the control chamber [6] maintains the level of liquid in the drums, so that the drums [35] has a space for the gasses expelled from the last gas chamber [7] and then cylinder [31]. However, the liquid circulation pipe [67] and control chamber [68] are not required when a liquid [62] is used instead of solution of liquids or gasses [66].

The cold ice or other means of cooling can be applied to the condenser. The frozen surface of the ocean and lakes during winter can be used to condense in the condenser where such ice is placed instead of liquid 64 in the container of the condenser. And where such cooling mechanisms are available, the atmospheric heat can be converted to mechanical and electrical energy. The liquid that boils in the atmospheric temperature i.e. room temperature or below it and above the temperature of the condensing material in the condenser is used in the boiler and atmospheric temperature acts as a heat provider. Similarly, the heat lying in the bottom of the oceans during winter where the water is in liquid state while the surfaces are frozen during winter can be utilized for running the system. The geo-thermal heat can be used in the boiler while the atmospheric temperature can be used for cooling in the condenser during winter. For using geo-thermal heat the water or similar liquid is passed below the surface of the earth and the returned heat or vapor is used to provide the heat energy to the boiler 1.

Where cooling mechanisms are available other than transferring heat to the environment, the condenser [33] is insulated.

Where a cooling temperature is used in the condenser [33], efficiency of the system increases. Further, with the use of such cooling method, the liquid that can boil in a temperature nearer to atmospheric temperature i.e. low temperatures can be used more efficiently in the boiler. And this is possible in case of solutions of liquids or gasses [66] that boil however instead of condensing they dissolve. Such liquids generate gas that has boiling and condensing point much lower than the atmospheric temperature. They are generally dissolved in water that has boiling point above atmospheric temperature. Their solution with water is boiled in the boiler while after generation of energy in the upper part of liquid chamber the gas are dissolved in the dissolving liquid generally with water at the drums in the condenser. Ammonium hydroxide, carbon dioxide solution etc. are such liquids where the gas like ammonia, carbon dioxide generated after boiling has temperature lower than atmospheric temperature or condensing point of water. In such a case where water is used in liquid chamber for buoyancy force, an eutectic mixture is made with salts like calcium chloride that has a freezing point of about −25° C. when dissolved in water. In some cases solids are also dissolved, like ammonium bicarbonate, ammonium carbonate etc. and used for working fluid where they are boiled in boiler and dissolved or reacted to form solutions of original material in the dissolving drums.

Where the condensing point of the vapor (gas) is lower than the atmospheric temperature, the concentric pipes [56] are maintained around the liquid chamber [3, 4] and gas chambers [6, 7] in the upper part of the system in case of single liquid and gas chamber and in the later part of the system in case of series of liquid and gas chamber. Similar concentric pipe [56] is also maintained around the cylinder. The concentric pipes [57] around the liquid chamber, gas chamber and cylinder contains a flowing liquid which obtains cooling temperatures or even freezing temperatures and passes it to the condenser or can be brought for external use. The liquid flows to and from such concentric pipes [57] to condenser through Condenser cooling pipe [58] and flows to and from the cylinder through concentric cylinder pipe [59].

The liquids used in the liquid chamber(s) [2,3,4] are such that they do not dissolve the vapor or gas generated in the boiler nor react with it. As for example when ammonium hydroxide is used in the boiler, either ammonium hydroxide is used in the liquid chamber or water mixed with sodium hydroxide is used in liquid chamber. This makes the ammonia gas from boiler pass to the condenser without dissolving in the liquid chamber.

For the increase in output at lower height, the pressure is increased in the liquid chambers by adding pressure valves in between the gas chamber and liquid chamber at the bottom part. The pressure valve allows the gas to pass to the succeeding liquid chamber only when a certain pressure is reached. This increases pressure and hence the adiabatic expansion in the succeeding liquid chamber thereby increasing the output while the input heat increases at the diminishing rate for the increase in pressure. Thus, the efficiency of the system increases and reaches up to 100% at lower heights or the efficiency increases till the critical temperature and pressure is reached at the bottom of liquid chamber or at boiler.

The invention claimed is:

1. A thermal buoyant high-efficiency system for the generation of mechanical and electrical energy, comprising:
   at least one boiler [1],
   a liquid chamber [2] or a series of liquid chambers [2, 3, 4], each liquid chamber [2, 3, 4] being in the shape of a tall pipe and containing a liquid [63],
   a horizontal pipe [15] connecting the at least one boiler [1] to the liquid chamber [2] or to a first of the series of liquid chambers [2], where vapor from the at least one boiler [1] obtains buoyancy in the liquid chamber,
   at least one vapor-liquid phase valve [26] to separate liquid [62] in the at least one boiler [1] from the liquid [63] in the liquid chamber [2] or the first of the series of liquid chambers [2],
   each liquid chamber [2, 3, 4] opens to a gas chamber [5, 6, 7] from an upper side, wherein the gas chamber [5] connects to a gas turbine [11] for a single set of liquid and gas chamber [2, 5], while for a series of liquid and gas chambers [2, 3, 4; 5, 6, 7], each gas chamber [5, 6], aside from the final gas chamber [7], is connected to a bottom of a succeeding liquid chamber [3, 4], with a chamber valve [27, 28] placed at a connection part between the gas chamber and the bottom of the succeeding liquid chamber, and the final gas chamber [7] is connected to the gas turbine [11],
   a turbine [8, 9, 10] immersed in the liquid [63] at an upper part of each liquid chamber [2, 3, 4] and configured to rotate when the vapor flows through the turbine [8, 9, 10],
   a tower supporting the liquid chamber(s) [2; 2, 3, 4],
   an alternator [13] connected to the turbine(s) [8, 9, 10] via an axle [12], wherein the alternator is placed at a height of the turbine(s) [8, 9, 10] or on the ground to convert the mechanical energy of the turbine(s) to electrical energy,
   a cylinder [31] connected to the gas turbine [11], and
   a condenser [33] connected to the cylinder [31] to regulate a temperature and pressure in the cylinder [31], the condenser having multiple pipes [34] immersed in a condensing liquid, wherein the condenser [33] opens to the at least one boiler [1] through a condenser out-pipe [18], a pusher [36] or a motor [37] and a liquid-in pipe [16] at a liquid re-input section [23] to re-input condensed liquid to the at least one boiler [1] for continuing the generation of energy.

2. The system according to claim 1, wherein the at least one boiler [1] receives a low temperature heat from sunlight by being placed at a ground level or from warm water by being dipped in the warm water in storages, ponds, lakes or oceans, or receives a high temperature source of heat, each boiler [1] comprises a flat surface with a surface area and a narrower vertical neck [1b] and is filled with liquid to the narrower vertical neck [1b], the boiler having a larger surface area in the case of receiving the low temperature heat or a smaller surface area and with a space inside the boiler equal to the surface area of the boiling liquid for increasing vapor pressure in the case of receiving the high temperature sources of heat, and
   wherein a pressure in the at least one boiler [1] is adjustable depending upon the temperature of the available source of heat and a pressure at the bottom of the liquid chamber [2] for the given height of the liquid chamber [2] or the given total height of the series of liquid chambers [2, 3, 4], so that the boiling point of the liquid in the at least one boiler is not increased above the temperature of the available source of heat with an increased height and increased pressure and the liquid in the at least one boiler [1] is able to boil at the temperature of the available heat source by adjusting the surface area in the at least one boiler [1].

3. The system according to claim 1, wherein different liquids placed in the at least one boiler [1] and the liquid chamber(s) [2, 3, 4] are separated by the at least one vapor-liquid phase valve [26], wherein a liquid with low boiling point and low density is placed in the at least one boiler while a denser liquid with higher boiling point is placed in the liquid chamber(s) [2, 3, 4].

4. The system according to claim 1, wherein the gas turbine [11] placed in between the gas chamber [5] or the final gas chamber [7] and the cylinder [31] also generates electricity from the flow of vapor to the condenser [33].

5. The system according to claim 1, wherein the height of the liquid chamber [2] or series of liquid chambers [2,3,4] is adjustable and increased height of the system increases the buoyancy force along with output and efficiency of the system until critical temperature and pressure is reached in the bottom of the liquid chamber(s) or in the boiler.

6. The system according to claim 1, comprising the series of liquid and gas chambers [2, 3, 4; 5, 6, 7] joined with the chamber valves [27, 28] at the bottom for attaining increased efficiency at lower height.

7. The system according to claim 1, wherein the condenser [33] is placed on a surface and multiple pipes [34] increase the area of contact of the vapor in the multiple pipes [34] with the condensing liquid [64] in a container [33a] of the condenser [33], and the condensing liquid [64] outside the pipes [34] passes the heat to the atmosphere or to ice on the ocean.

8. The system according to claim 1, wherein the cylinder [31] is placed before the condenser [33] for temporary storage of the vapor before passing the vapor to the condenser [33] depending on the temperature of the heat source and volume of the vapor passing to the condenser [33] and for regulating pressure and temperature.

9. The system according to claim 1, wherein the liquid [62] in the at least one boiler [1] boils at the temperatures of the applied heat source and an increase in boiling point due to increase in pressure at least because of liquid chamber height is adjusted to the temperature of the applied heat source by changing an area of the at least one boiler [1] as required and the liquid in the liquid chamber(s) [2, 3, 4] is adjusted to be in liquid state despite cooling vapor or atmospheric temperature.

10. The system according to claim 1, wherein low temperature heat from sunlight is captured by dehydrating vessels [47] having a large area while waste heat energy or waste electrical energy are captured in a heating tank and stored in chemicals, molten salts or liquids in a storage tank [44] for present or future usage; in the case of liquids, the liquids are used to directly heat the at least one boiler [1], while in the case of chemicals or molten salts, the chemicals or molten salts are hydrated in a heat generation tank [39] by fresh water from a water tank [46] in a water heater [45] conveyed through a first motor [41] and a water pipe [21], hot water in a hot water reservoir [43] is heated by the heat generation tank [39] through a heat exchanging surface of the heat generation tank [39], and a second motor [42] in a hot water circulation pipe [22] conveys the hot water to the at least one boiler [1] and cooled water back into the hot water reservoir [43] for regular supply of heat.

11. A thermal buoyant high-efficiency system for the generation of mechanical and electrical energy, comprising:
   at least one boiler [1],
   a liquid chamber [2] or a series of liquid chambers [2, 3, 4], each liquid chamber [2 or 2, 3, 4] being in the shape of a tall pipe and containing a liquid [63],
   a horizontal pipe [15] connecting the at least one boiler [1] to the liquid chamber [2] or to a first of the series of liquid chambers [2], where vapor of a liquid [62] from the at least one boiler [1] obtains buoyancy force in the liquid chamber [2, 3, 4],
   at least one liquid-vapor phase valve [26] to separate the liquid [62] in the at least one boiler [1] from the liquid [63] in the liquid chamber [2] or the first of the series of liquid chambers [2],
   each liquid chamber [2, 3, 4] opens to a gas chamber [5, 6, 7] from an upper side, wherein the gas chamber [5] connects to a gas turbine [11] for a single set of liquid and gas chamber [2, 5], while for a series of liquid and gas chambers [2, 3, 4; 5, 6, 7], each gas chamber [5, 6], aside from the final gas chamber [7], is connected to a bottom of a succeeding liquid chamber [3, 4], with a chamber valve [27, 28] placed at a connection part between the gas chamber and the bottom of the succeeding liquid chamber, and the final gas chamber [7] is connected to the gas turbine [11],
   a turbine [8, 9, 10] immersed in the liquid at an upper part of each liquid chamber [2, 3, 4] and configured to rotate when the vapor flows through the turbine [8, 9, 10],
   an alternator [13] connected to the turbine(s) [8, 9, 10] via an axle [12], wherein the alternator is placed at a height of the turbine(s) [8, 9, 10] or on the ground to convert the mechanical energy of the turbine(s) to electrical energy,
   a cylinder [31] connected to the gas turbine [11], and
   a condenser [33] connected to the cylinder [31] through a condenser in-pipe [17] to regulate a pressure in the cylinder [31], the condenser having multiple pipes [34] immersed in a condensing liquid, wherein the condenser opens to the at least one boiler [1] through a condenser out-pipe [18], a pusher [36] or a motor [37] and a liquid in-pipe [16] at a liquid re-input section [23] to re-input the liquid to the at least one boiler [1] for the generation of energy at room temperature.

12. The system according to claim 11, wherein the at least one boiler [1] receives heat from the air in the surrounding environment or water in the ocean, and the liquid used in the at least one boiler [1] is able to boil at or below room temperature and above the temperature of the condenser [33].

13. The system according to claim 11, wherein the condensing liquid in the condenser [33] is obtained from ice of oceans.

\* \* \* \* \*